United States Patent
Winslow et al.

(10) Patent No.: US 8,962,536 B2
(45) Date of Patent: Feb. 24, 2015

(54) HEAT GENERATING SYSTEM FOR ENHANCING OIL RECOVERY

(75) Inventors: Gregory Winslow, Houston, TX (US); Gabriel Prukop, Katy, TX (US); Varadarajan Dwarakanath, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 675 days.

(21) Appl. No.: 12/971,785

(22) Filed: Dec. 17, 2010

(65) Prior Publication Data

US 2012/0152536 A1  Jun. 21, 2012

(51) Int. Cl.
- *C09K 8/584* (2006.01)
- *C09K 8/588* (2006.01)
- *E21B 43/24* (2006.01)
- *E21B 43/17* (2006.01)

(52) U.S. Cl.
CPC ............. *C09K 8/584* (2013.01); *C09K 8/588* (2013.01); *E21B 43/17* (2013.01); *E21B 43/24* (2013.01)
USPC ........... 507/269; 507/140; 507/225; 507/226; 507/256; 507/259; 507/266; 507/267; 166/272.1

(58) Field of Classification Search
None
See application file for complete search history.

(56) References Cited

U.S. PATENT DOCUMENTS

| | | | |
|---|---|---|---|
| 3,690,376 A | | 9/1972 | Zwicky et al. |
| 4,178,993 A | | 12/1979 | Richardson et al. |
| 4,219,083 A | | 8/1980 | Richardson et al. |
| 4,232,741 A | * | 11/1980 | Richardson et al. ......... 166/281 |
| RE30,935 E | * | 5/1982 | Richardson et al. ......... 166/300 |
| 4,330,037 A | * | 5/1982 | Richardson et al. ..... 166/250.01 |
| 4,410,041 A | * | 10/1983 | Davies et al. ................ 166/300 |
| 6,035,933 A | | 3/2000 | Khalil et al. |
| 6,981,548 B2 | | 1/2006 | Wellington et al. |
| 7,740,068 B2 | | 6/2010 | Ballard |
| 7,811,541 B2 | | 10/2010 | Lefenfeld et al. |
| 2005/0178546 A1 | * | 8/2005 | Reddy et al. .................. 166/278 |
| 2009/0151941 A1 | | 6/2009 | Dwarakanath et al. |
| 2010/0166648 A1 | | 7/2010 | Lefenfeld et al. |
| 2010/0316917 A1 | | 12/2010 | Lefenfeld et al. |
| 2012/0145389 A1 | * | 6/2012 | Fitzpatrick, Jr. ............. 166/278 |

OTHER PUBLICATIONS

International Search Report, issued on Jun. 29, 2012 during the prosecution of International Application No. PCT/US2011/063069.
Written Opinion of the International Searching Authority, issued on Jun. 29, 2012 during the prosecution of International Application No. PCT/US2011/063069.
International Preliminary Report on Patentability, issued on Jun. 18, 2013 during the prosecution of International Application No. PCT/US2011/063069.

* cited by examiner

*Primary Examiner* — John J Figueroa
(74) *Attorney, Agent, or Firm* — Gregory L. Porter; Tiffany E. Weksberg

(57) ABSTRACT

The instant invention pertains to a composition which may be useful for enhancing oil recovery. The composition typically comprises the reaction mixture of at least (a) two or more compounds capable of generating at least about 20 kcal to about 150 kcal per mole when contacted; (b) one or more suitable surfactants or one or more suitable polymers or a mixture thereof; and (c) oil. The invention also pertains to a method for enhancing oil recovery wherein a suitable system is injected through a wellbore into a reservoir to enhance mobility of oil.

13 Claims, 2 Drawing Sheets

HEAT GENERATING SYSTEM FOR ENHANCING OIL RECOVERY

FIELD OF THE INVENTION

The instant invention pertains to a heat generating system useful for enhancing oil recovery.

BACKGROUND AND SUMMARY OF THE INVENTION

Economical hydrocarbon recovery from reservoirs may sometimes prove difficult due to, for example, low recovery efficiencies. To improve efficiencies, various enhanced recovery methods may be employed. For example, sometimes heated fluids are injected into the reservoir in an attempt to facilitate the flow of hydrocarbons such as oil through the reservoir to the producer. Unfortunately, heating the fluids often requires substantial energy which proves uneconomical. Accordingly, there is a need for improved compositions and methods of enhancing oil recovery which are efficient and economical. It would further be beneficial if such methods and/or compositions enhanced the mobility of the hydrocarbon to facilitate its recovery. And it would be of even greater benefit if such methods and compositions could employ a gas which could assist in, for example, sweeping the oil through the reservoir to the producer.

Fortunately, the present inventors have discovered new processes and compositions which may meet one or more of the aforementioned needs or even have other advantages. In one embodiment, the invention relates to a composition comprising the reaction mixture of at least (a) two or more compounds capable of generating at least about 20 kcal to about 150 kcal per mole when contacted; (b) one or more suitable surfactants or one or more suitable polymers or a mixture thereof; and (c) oil.

In another embodiment, the invention relates to a method for enhancing oil recovery. The method comprises providing a subsurface reservoir containing hydrocarbons therewithin and providing a wellbore in fluid communication with the subsurface reservoir. A suitable system is then injected through the wellbore into the reservoir such that the system generates at least 50 kcal/mole in a manner such that one or more of oil saturation, capillary number, viscosity, and or interfacial tension, are reduced such that the oil is more mobile. The system comprises: (1) two or more compounds capable of generating at least 75 kcal/mole when contacted; and (2) one or more suitable surfactants or one or more suitable polymers or a mixture thereof.

DETAILED DESCRIPTION OF THE INVENTION

General Composition

Figure 1:
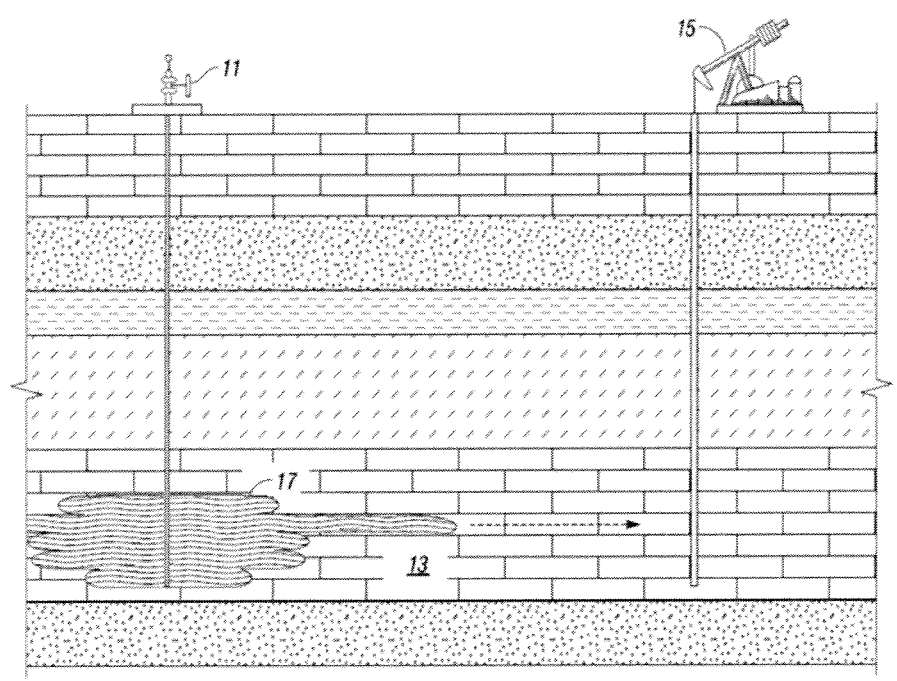
FIG. 1 is a schematic sectional view of a reservoir that is in fluid communication with an injection well and an production well during enhanced oil recovery operations after injection of a composition comprising a reaction mixture in accordance with the present invention.

The instant invention in one embodiment pertains to a composition comprising the reaction mixture of at least (a) two or more compounds capable of generating at least about 20 kcal to about 150 kcal per mole when contacted; (b) one or more suitable surfactants or one or more suitable polymers or a mixture thereof; and (c) oil. The term "reaction mixture" is intended to include, for example, at least components (a), (b), and (c) in a simple mixture, as well as, any products which may be formed due to any reaction of (a), (b), and/or (c).

When used for enhanced oil recovery in, for example, the method described in more detail below, components (a) and (b) are typically injected into the reservoir in any convenient manner. That is the manner of injection is not particularly critical so long as the components beneficially effect the oil recovery from the reservoir. Thus, components (a) and (b) may be injected together, for example, simultaneously, or separately, for example, consecutively. Components (a) and (b) then typically combine with component (c) oil to form the composition in the reservoir that benefits the hydrocarbon recovery. The benefit of the reaction mixture comprising (a) two or more compounds capable of generating at least about 20 kcal to about 150 kcal per mole when contacted and (b) one or more suitable surfactants, polymers, or a mixture thereof may include, for example, enhancing the oil recovery in a reservoir by at least about 5, or at least about 10, or even at least about 15% as compared to employing the same system in the absence of component (a).

Component (a)

Component (a) usually comprises two or more compounds capable of generating heat when contacted. The amount of heat generated will vary depending upon the compounds selected. And the amount of heat desired to beneficially effect the hydrocarbon recovery will vary depending upon, for example, the properties of the oil and reservoir. Generally, the amount of heat desired is at least that amount that will assist in recovering the oil by, for example, making the oil more mobile. That is, one or more of oil saturation, capillary number, viscosity, or interfacial tension may be improved such that the oil is more readily recovered. On the other hand, the amount of heat desired to be generated should usually not be so high that there is a substantial risk that the reaction is uncontrollable in the presence of oil leading to fire and/or explosion. In many situations the two or more compounds are selected such that they are capable of generating at least about 20 kcal, preferably at least about 40, more preferably at least about 50 kcal, up to about 150 kcal, per mole of compound when contacted.

The two or more compounds that react to generate heat may be any suitable compounds. For oil recovery applications, the two compounds typically do not react significantly with the oil or surfactants in the composition. Depending upon the identity of the two or more compounds that react to generate heat, a catalyst may be necessary or desirable. Generally, suitable reactions include oxidation-reduction, acid-base (e.g., HCl+NaOH), ionization, and dilution, i.e., heat of solutions. Such reactions are described in, for example, "*Experimental Thermodynamics*" Vol. II, Editor H. A. Skinner. Interscience Publishers, 1962 and "Chemical Thermodynamics" $3^{rd}$ Ed. Frederick T. Wall, W.H. Freeman, San Francisco, 1974 which are incorporated by reference to the extent that they are not inconsistent.

In one embodiment, the two or more compounds are capable of undergoing a redox reaction, i.e., a chemical reaction in which atoms have their oxidation number changed or the like. As mentioned above, such redox reactions are known. Such reactions include, for example, $KMnO_4 + 4C_3H_5(OH)$. In some embodiments, reaction to faun heat via a redox or other reaction produces one or more gases such as nitrogen as a by-product. The production of such gases in the reservoir may be advantageous in some reservoirs because the gas or gases may assist in sweeping reservoir oil toward a producer.

While additional gases may also be injected into the reservoir, the in-situ reservoir production of one or more gases may reduce or even eliminate the need to inject other gases.

In one embodiment, the redox reaction involves two or more compounds that comprise an ammonium halide such as, for example, ammonium chloride, and an alkali metal nitrite such as, for example, sodium nitrite. This reaction advantageously usually produces nitrogen which as described above may enhance recovery methods.

The amount of component (a) in the composition varies widely depending upon the specific ingredients and the desired application. Generally, the amount of component (a) is selected based upon the amount of heat that one desires to generate in the reservoir. This, of course, depends upon the initial temperature of the reservoir and other characteristics of the reservoir such as permeability.

Component (b)

The one or more surfactants or one or more polymers or mixture thereof which comprise component (b) of the composition will, of course, vary depending upon the application of the composition. If employed in enhanced oil recovery processes, the one or more surfactants or one or more polymers or mixture thereof will generally be selected based on the properties of the oil, brine, and reservoir. That is, factors such as oil viscosity, reservoir pressure, reservoir temperature, reservoir permeability, reservoir porosity, salinity, hardness, and/or clay content may be among the factors the skilled artisan considers when selecting component (b). In some cases, the skilled artisan refer to Surfactants (Fundamentals and Applications in the Petroleum Industry) by Laurier L. Schramm 2000 Press Syndicate and U.S. Patent Publication 20090151941 each of which are incorporated herein by reference to the extent they are not inconsistent.

Generally, the one or more surfactants may be selected from the group consisting of non-ionic surfactants, anionic surfactants, and mixtures thereof. Useful non-ionic surfactants may include, for example, those selected from the group consisting of alkoxylated alcohols and alkoxylated alkylphenols. Useful anionic surfactants may include, for example, those selected from the group consisting of alkylaryl sulfonates, alkylaryl sulfates, alkylaryl succinates, alkyl sulfonates, alkyl sulfates, and alkyl succinates. Other suitable anionic surfactants may include, for example, those selected from the group consisting of alkylaryl alkoxy sulfonates, alkylaryl alkoxy sulfates, alkylaryl alkoxy succinates, alkyl alkoxy sulfonates, alkyl alkoxy sulfates and alkyl alkoxy succinates. In one embodiment, suitable surfactants are those made with ethyleneoxide, propyleneoxide, and/or butyleneoxide.

Generally, the one or more polymers may be selected from the group consisting of polyacrylamides, partially hydrolyzed polyacrylamides, polyvinylpyrroidone/acrylamide copolymers, and vinyl sulfonate/vinl amide/acrylamide terpolymers. (AMPS).

The amount of component (b) in the composition varies depending upon the specific ingredients, the desired application, and reservoir. Generally, the amounts are as described in, for example, U.S. Patent Publication 20090151941. In some embodiments, the surfactant(s) may comprise from about 0.25 to about 0.5% of the composition based on the total composition. Similarly, the polymer(s) may comprise from about 500 to about 2000 ppm of the composition based on the total composition.

Component (c)

Component (c) is oil. For enhanced oil recovery applications such oil is that typically found in the reservoir. Usually, such oil is that oil that one is seeking to recover. Thus, the oil has an initial oil saturation, viscosity, and/or interfacial tension which is modified upon contact with the composition comprising the reaction mixture comprising components (a) and (b). Advantageously, one or more of these characteristics are modified such that the oil is more mobile and more readily moved toward the producer and recovered.

Other ingredients

The composition may include other ingredients so long as they do not significantly impair the heat generating compounds of component (a). Such compounds may include, for example, polymers, chelating agents, viscosifying agents, reaction control chemicals, and the like.

In some embodiments, the composition further comprises a chelating agent. The chelating agent may be selected from the group consisting of complexes or masks of multi-valent cations such as EDTA or NTA.

If desired, a reaction control chemical may be included within the composition. Such chemicals may assist in controlling how or when the reaction of the two or more compounds of component (a) occurs. For example, it is generally desirable that the heat generation occurs in the reservoir in enhanced oil recovery processes. Thus, it may be desirable to include a substance which inhibits the reaction of the two or more compounds of component (a) until, for example, the two or more compounds enter the pay zone of the reservoir. Such substances may include those that perhaps form a physical barrier prohibiting the substances from reacting until a certain condition is achieved such as temperature or pH that is unique to the pay zone of the reservoir. In this manner, the two or more compounds of component (a) may be injected into a wellbore and the heat generating reaction is delayed until component (a) enters the desired reservoir area exhibiting the unique condition. Suitable reaction control chemical may include those which assist the component (a) in staying in, for example, an emulsion until something in the reservoir such as a pH change or contact with perhaps water and/or oil assists in breaking the emulsion at the desired time to trigger the reaction to produce heat. On the other hand, should component (a) be in an emulsion form then a demulsifying agent may be introduced in order to break the emulsion and trigger the reaction to produce heat at the desired time.

Process

The aforementioned composition may be useful in, for example, oil recovery processes. In one embodiment, a method for enhancing oil recovery comprises providing a subsurface reservoir containing hydrocarbons therewithin and providing a wellbore in fluid communication with the subsurface reservoir. A suitable system is injected through the wellbore into the reservoir such that the system generates at least about 50 kcal/mole. The injection and system are such that oil in the reservoir in contact with the system is made more mobile. That is, one or more of oil saturation, viscosity, and interfacial tension, may be improved to enhance oil recovery. The method then comprises recovering the oil originally present in the reservoir.

Although only exemplary embodiments are specifically illustrated and described herein, it will be appreciated that many modifications and variations of the process and apparatus described herein are possible in light of the above teachings and within the purview of the appended claims without departing from the spirit and intended scope of the claimed subject matter.

EXAMPLE 1

Referring to FIG. 1, an injection well 11 is illustrated extending to a portion of a subsurface reservoir 13 which contains hydrocarbons for production, such that injection well 11 is in fluid communication with subsurface reservoir 13 and the hydrocarbons. A production well 15 is positioned a predetermined distance away from injection well 11 and is also in fluid communication with reservoir 13 in order to receive the hydrocarbons therefrom. As will be readily appreciated by those skilled in the art, there can be additional production wells 15 spaced apart from injection well 11 at predetermined locations to optimally receive the hydrocarbons being pushed through reservoir 13 due to injections from injection well 11.

To determine a suitable composition for injection into a given reservoir, parameters of the reservoir are usually measured or considered. Such parameters include reservoir permeability, amount of reservoir water, and reservoir physical properties such as temperature and pressure. A core flood measurement with the core of the targeted reservoir may also be employed using a range of contemplated components (a) and (b). In addition, a routine test to determine whether the selected components are suitable may be done. Such a test may include, for example, a measurement of heat generated by component (a) at expected reservoir conditions.

In an embodiment of the invention, a composition of the invention is continuously or intermittently injected through injection well 11 into reservoir 13. The 17 preferably disperses through reservoir 13, with at least a portion thereof proceeding toward production well 15. Advantageously, one may expect enhanced recovery over many conventional prior art methods.

EXAMPLE 2

First, using a wrapped glass beaker in the presence of a hand held digital thermometer 0.284 moles/L of Potassium Permanganate was reacted with 0.168 moles/L of glycerol according to the following reaction: $14KMnO_4 + 4C_3H_5(OH)$ à $7Mn_2O_3 + 7K_2CO_3 + 5CO_2 + 16H_2O$.

Figure 2:
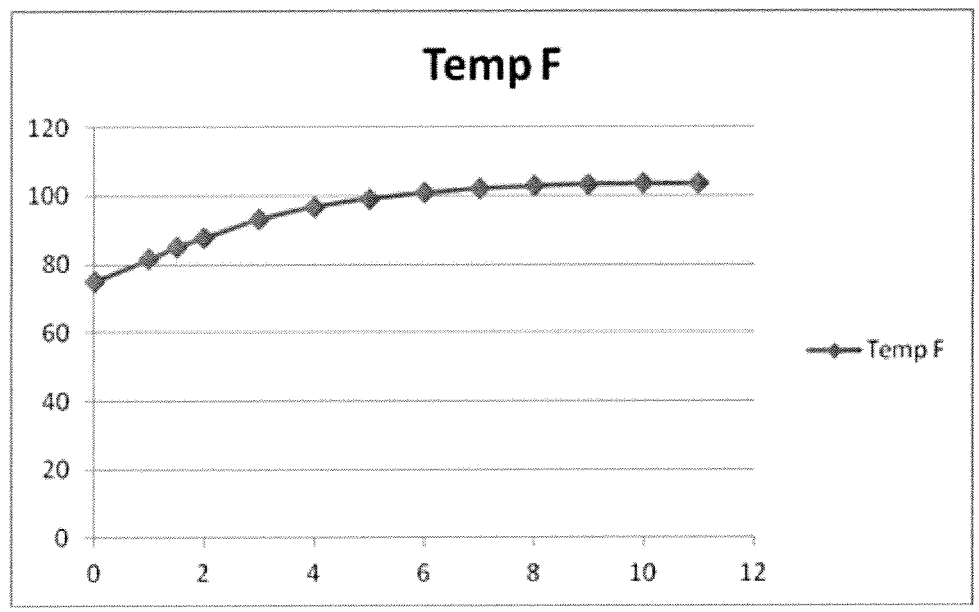
FIG. 2 is a plot of temperature versus time for the reaction in Example 2.

When 25 cc of each solution were mixed the resultant 50 cc solution's temperature rose from 23.9 degrees C. (75.0 deg F.) to a max of 39.7 deg C. (103.5 deg F.). Using the amount of chemical (0.0042 grams) in this experiment with 50 cc total water the temperature increased by over 28 deg F. In a field situation such as Example 1 above this would be equivalent of using 0.294 pounds of chemical per barrel of water to get a 28 deg F. change which is a desirable change for many situations while higher temperatures could be obtained using more chemical if desired. The data is shown in FIG. 2 wherein the axes are Temp F and Time, minutes. The final increased temperature is reached in about 8 minutes.

The aforementioned reaction was repeated using a Dewar flask and temperature probe with digital recording. A delta T of 20.85 deg C. (37.5 deg F.) resulted from the increased in insulation. Accordingly, the 0.294 pounds of chemical would raise the temperature of an injected barrel of water or enhanced oil recovery chemical by 37.5 deg F. Thus, the chemical could be mixed at the wellhead (surface) and just pumped down thereby avoiding chemical lines down the well.

What is claimed is:

1. A method for enhancing oil recovery, comprising:
   (a) providing a subsurface reservoir containing hydrocarbons therewithin;
   (b) providing a well bore in fluid communication with the subsurface reservoir;
   (c) injecting a suitable system through the wellbore into the reservoir such that the system generates at least 50 kcal/mole in a manner such that one or more of oil saturation, capillary number, viscosity, and interfacial tension, are reduced such that the oil is more mobile; wherein the system comprises: (1) two or more compounds capable of generating at least 75 kcal/mole when contacted, wherein the two or more compounds comprise an ammonium halide and an alkali metal nitrite; and (2) one or more suitable surfactants or one or more suitable polymers or a mixture thereof.

2. The method of claim 1 wherein the method further comprises recovering oil originally present in the reservoir.

3. The method of claim 1 wherein the two or more compounds are capable of undergoing a redox reaction.

4. The method of claim 1 wherein the two or more compounds react to form at least one gas.

5. The method of claim 1 wherein the one or more suitable surfactants are selected from the group consisting of alkoxylated alcohols, alkoxylated alkyl phenols, alkylaryl sulfonates, alkylaryl sulfates, alkylaryl succinates, alkyl sulfonates, alkyl sulfates, alkyl succinates, alkylaryl alkoxy sulfonates, alkylaryl alkoxy sulfates, alkylaryl alkoxy succinates, alkyl alkoxy sulfonates, alkyl alkoxy sulfates and alkyl alkoxy succinates.

6. The method of claim 1 wherein system further comprises (d) a polymer selected from the group consisting of polyacrylamides, partially hydrolyzed polyacrylamides, polyvinylpyrrolidone/acrylamide copolymers, and vinyl sulfonate/vinyl amide/acrylamide terpolymers (AMPS).

7. The method of claim 1 wherein the two or more compounds comprise an ammonium chloride and sodium nitrite.

8. The method of claim 1 wherein the two or more compounds react to form nitrogen gas.

9. The method of claim 1 wherein the one or more suitable surfactants are selected from the group consisting of nonionic surfactants, anionic surfactants, and mixtures thereof.

10. The method of claim 1 wherein (2) of the system comprises a mixture of surfactant and polymer.

11. The method of claim 1 wherein the system further comprises a chelating agent.

12. The method of claim 1 wherein the system further comprises a reaction control chemical.

13. The method of claim 1 wherein the method is capable of enhancing the oil recovery by at least about 5% as compared to employing the same system in the absence of component (1).

* * * * *